United States Patent
Allen

[15] 3,638,469
[45] Feb. 1, 1972

[54] EXTRUSION APPARATUS AND METHOD

[72] Inventor: Herbert Allen, Houston, Tex.

[73] Assignee: Cameron Iron Works, Inc., Houston, Tex.

[22] Filed: Jan. 21, 1970

[21] Appl. No.: 4,542

[52] U.S. Cl. .................................................72/263, 100/257
[51] Int. Cl. ...........................B21c 23/00, A23b, A23l 3/34
[58] Field of Search .......................................72/263; 100/257

[56] References Cited

UNITED STATES PATENTS 3,211,085 10/1965 Zeppetello .............................100/257
3,466,915 9/1969 Boshold ..................................72/263

Primary Examiner—Charles W. Lanham
Assistant Examiner—Robert M. Rogers
Attorney—Hyer, Eickenroht & Thompson

[57] ABSTRACT

A preform of the material to be extruded is positioned in the die between the platens of a press, when the press is in a vertical position. In this position the sides of the die that require lubrication do not support the preform and the preform can be better aligned with the die. As extrusion begins, the die is rotated to extrude the preform in a horizontal direction where it can be supported conveniently as it leaves the die.

14 Claims, 9 Drawing Figures

PATENTED FEB 1 1972

Herbert Allen
INVENTOR.

BY Hyer, Eickenroht
& Thompson
ATTORNEYS

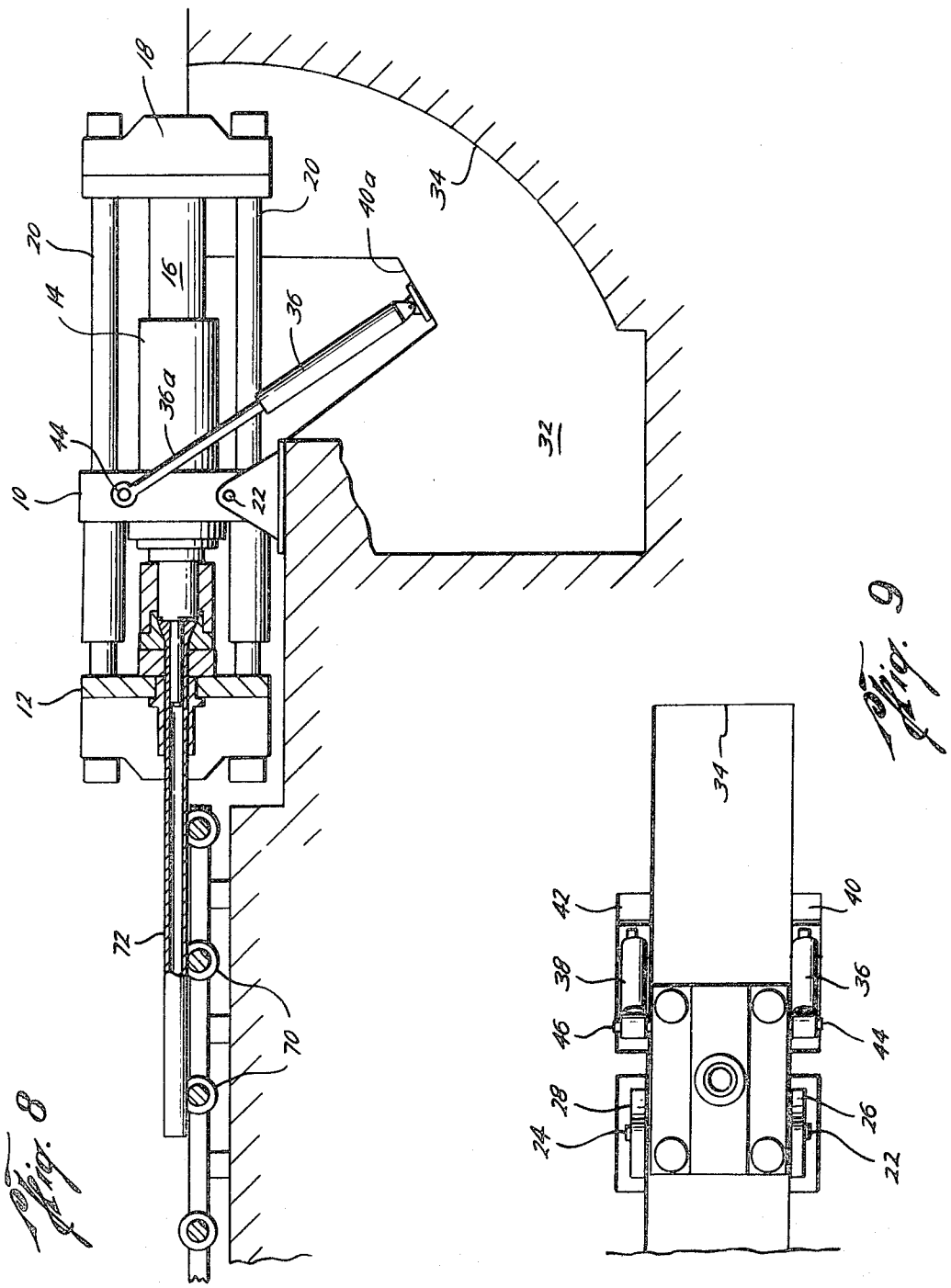

EXTRUSION APPARATUS AND METHOD

This invention relates to extrusion presses and to methods of operating the same.

This invention is particularly advantageous for making large metallic extrusions. With such extrusions the preforms, i.e., the material preshaped to be received by the dies, are bulky and heavy and, generally, they must be handled by hoisting equipment. In most instances it is easier to position such preforms in the die in a vertical press, i.e., the platens of the press are spaced apart vertically. This allows the parts of the die that confine the sides of the preform to be moved vertically into position, while the preform is supported on one end. Also, the surface of the die that engages the end of the preform, usually, need not be lubricated, whereas, the surfaces that confine the sides require lubrication. If these surfaces have to support the weight of the preform as they are positioned, the preform will tend to scrape the lubricant off this surface.

Also, the preforms are, of course, hot since they are at the extrusion temperature for the particular material being extruded. Therefore, in the period of time between the loading of the preform and the beginning of the extrusion process, the intimate contact of the preform with one side of the die can greatly reduce, if not destroy, the effectiveness of the lubricant on that particular surface of the die. This adversely effects the extrusion operation. In addition, with the heated preform lying against one side of the die, the heat loss from that side of the preform through the die can be so much greater than the loss elsewhere, that the plasticity of the preform will be uneven when the extruding process begins. This will cause premature wear on the dies, since the force required to extrude the material varies with temperature. In addition, dimensional problems in the extrusion can result as well as structural variations. For these reasons, the loading of the preform can best be done when the press is vertical.

When using the vertical press for long, heavy extrusions, however, tall and expensive handling equipment is required to support the extrusion as it rises upwardly above the press and to remove the extrusion when the process is completed. On the other hand, with a horizontal press (platens spaced horizontally) the extrusion can be supported on horizontal racks at it comes from the die in a simple and inexpensive manner. Therefore, for long and heavy extrusions, the handling operation is easier with the press horizontal.

Therefore, it is an object of this invention to provide apparatus for and a method of forming elongated extrusions wherein the die loading advantages of the vertical press and the extrusion handling advantages of the horizontal press are obtained.

It is another object of this invention to provide apparatus for and a method of forming elongated extrusions wherein the preform is loaded in the dies when the press is in a vertical position and the extrusion is supported and taken from the press, while the press is in a horizontal position.

It is another object of this invention to provide a press in which part of its operation may be preformed in one position thereof and another part in a position perpendicular thereto.

These and other objects, advantages, and features of the invention will be apparent to those skilled in the art from a consideration of this specification, including the attached drawings and appended claims.

The invention will now be described in connection with the attached drawings in which, FIG. 1 is a side view, partly in elevation and partly in vertical section, through the preferred embodiment of the apparatus of this invention;

FIG. 6 is a view similar to FIG. 1 showing the apparatus at the start of the extruding process;

FIG. 8 is a view showing the press of the apparatus in a horizontal position; and FIG. 9 is a top view of the apparatus of FIG. 1 taken along line 9—9.

Figure 1:
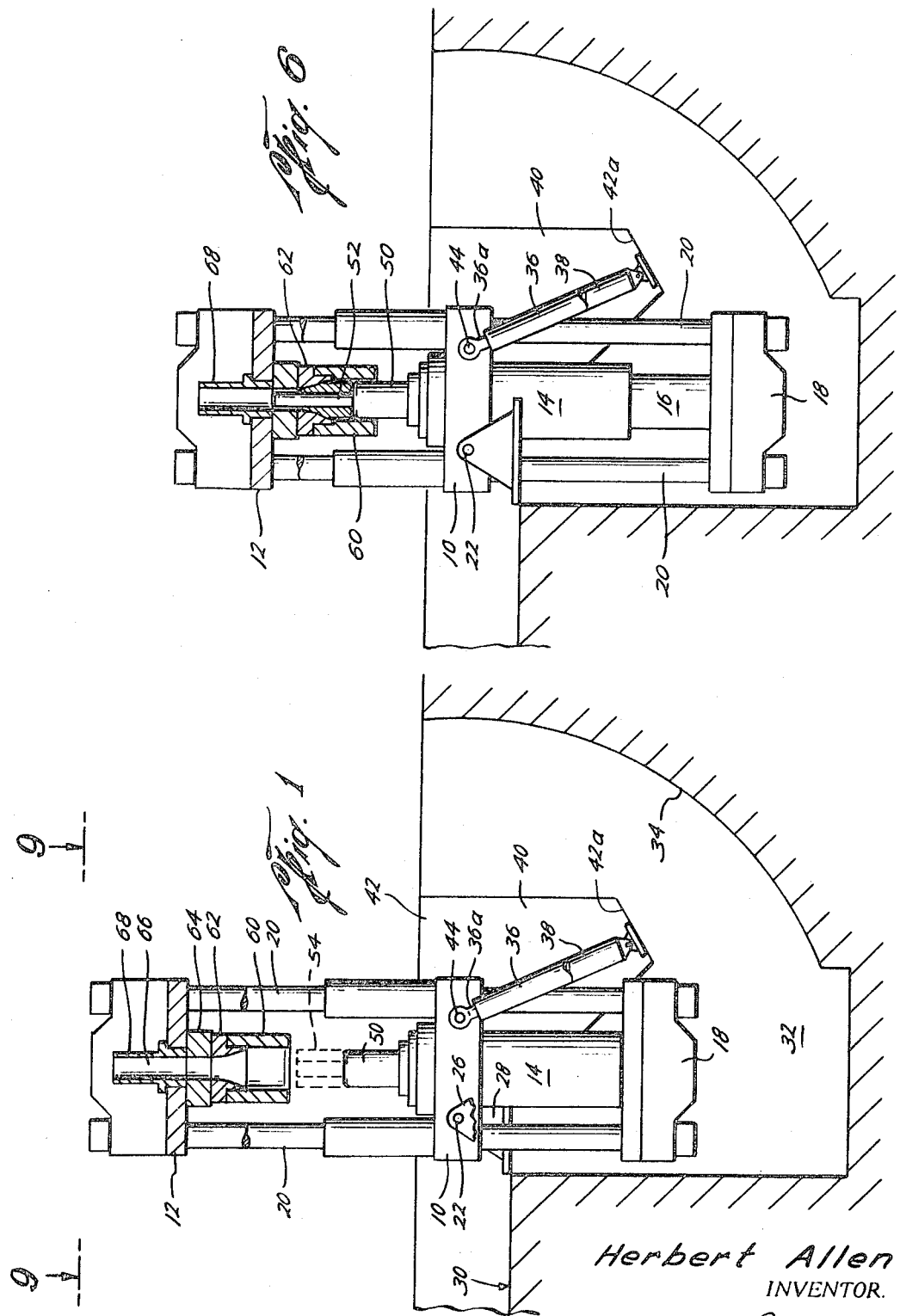
Figure 2:
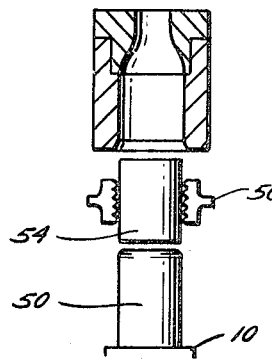
FIGS. 2-5 are views, partly in elevation and partly in vertical section, of a typical die and preform that is used when extruding an elongated tubular member, the figures being arranged to show the steps in positioning the preform in the die preparatory to the extruding process.

The extrusion press, as shown in FIG. 1, includes first and second platens 10 and 12. The press is shown in the vertical position with platens 10 and 12 substantially horizontal. The platens are in spaced parallel relationship for relative vertical movement.

Means are provided for moving the platens apart far enough to allow an extrusion die and a preform to be position between them and for moving the platens together to cause the dies to extrude the preform. In the embodiment shown, fluid cylinder 14 is attached to platen 10 and extends therebelow. A piston (not shown) in the cylinder is moved downwardly relative to cylinder 14 when the cylinder is supplied with fluid under pressure above the piston. This downward movement of the piston moves piston rod 16, (see FIG. 6) crosshead 18 and tie rods 20 (four of which are usually used) downwardly with the piston. Tie rods 20 are attached to and support platen 12 and move this platen toward platen 10 when the rods are moved downwardly. Power cylinder 14 provides sufficient force for the die compressed between the platens to extrude the material of the preform. To move platen 12 upwardly away from platen 10 requires only enough force to overcome the weight of the parts involved. This may be accomplished by applying pressure against the underside of the piston in cylinder 14.

Means are provided to support the press for pivotal movement between a first position where the dies and preform can be positioned between the platens with the preform supported on a die surface that does not require lubrication and a second position for extruding the preform in a horizontal direction. In the embodiment shown, platen 10 is supported by trunnions 22 and 24. The trunnions are supported for rotation around their longitudinal axes by bearing plates 26 and 28, which are mounted on base structure 30. The base structure can be any solid support for the press. It usually comprises a reinforced concrete slab. As shown, the base has cavity 32 into which the lower end of the press extends in FIG. 1. This positions the pivotal axis of the press closer to floor level, which as will be seen below, makes the handling of the extrusions more convenient. Curved wall 34 allows the lower end of the press to pivot out of the cavity.

Means are provided to pivot the press between the first and second positions described above. In the embodiment shown, fluid cylinders 36 and 38 are provided for this purpose. Cavity 32 has side pockets 40 and 42 that have inclined surfaces 40a and 42a, respectively. These surfaces support the ends of cylinders 36 and 38. As best seen in FIG. 9, the ends of rods 36a and 38a are pivotally connected to platen 10 by pins 44 and 46 at a point spaced from trunnions 22 and 24. Power cylinders 36 and 38 are double acting cylinders. By supplying them with fluid under pressure, the press, comprising the two platens and the means for moving the platens together, can be pivoted from the position shown in FIG. 1 to the position shown in FIG. 8.

Figure 3:
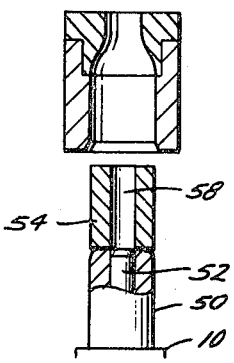
Figure 4:
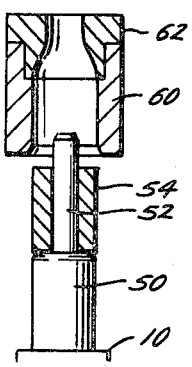
Figure 5:
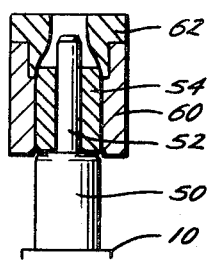

The first step in the operation of the apparatus is to position the preform and the dies between the platens of the press so that the preform can be supported on a die surface that does not require lubrication and the die can be moved vertically into position to extrude the preform. This is illustrated in FIGS. 2 through 5 in connection with a type of die for extruding a tubular member. Pedestal 50 rests on fixed platen 10. The pedestal is tubular and has a central opening through which central guide rod, or punch, or mandrel 52 can be moved. The means for so moving the mandrel is not shown in the drawing since any well know mechanism can be used for this purpose. With mandrel 52 withdrawn as shown in FIG. 3, the material to be extruded, preformed into a tubular shape such as preform 54, can be moved laterally by power tongs 56 to a position where the preform is supported on end by pedestal 50 with its central opening 58 in axial alignment with mandrel 52. Mandrel 52 has been prelubricated with an appropriate lubricant for the extrusion operation to be performed. With the preform in place, it is moved vertically through opening 58 in the preform. Preferably, there is sufficient clearance between the mandrel and the preform for the mandrel to be so position without having its lubricant scraped off the preform.

The weight of the preform is still taken by pedestal 50. The surface on the pedestal that supports the preform need not be lubricated since there will be little relative movement between the material of the preform and this surface during extrusion.

The other portions of the extrusion die comprise can 60 and throat 62. The throat and can are connected together and attached to movable platen 12. The can is a cylindrical member designed to enclose and confine the preform. With the press vertical, the can can be moved vertically downward to the position of FIG. 5 where it surrounds the preform without having the preform lying against and exerting its weight against one side of the can. The inside surfaces of the can and throat are also lubricated prior to their downward movement into position over the preform.

Thus, all of the advantages of loading a preform in a vertical press have been realized. The preform is centrally positioned with respect to the can and the mandrel and it is not exerting its weight against one of the lubricated die surfaces. Referring now to FIG. 1 the loading step is shown with preform 54 shown by the dotted lines. It is resting on pedestal 50 and can 60 and throat section 62 are positioned above the preform and supported by movable platen 12. Can 60 and throat 62 are connected to platen 12 through ring member 64. Platen 12 has opening 66, which is in register with the opening through ring 64 and the can and throat of the die. It is through this opening in the platen that the material extruded by the dies will pass as the platens move together. Tubular guide member 68 is attached to platen 12 to guide the extrusion through the platen.

Figure 7:
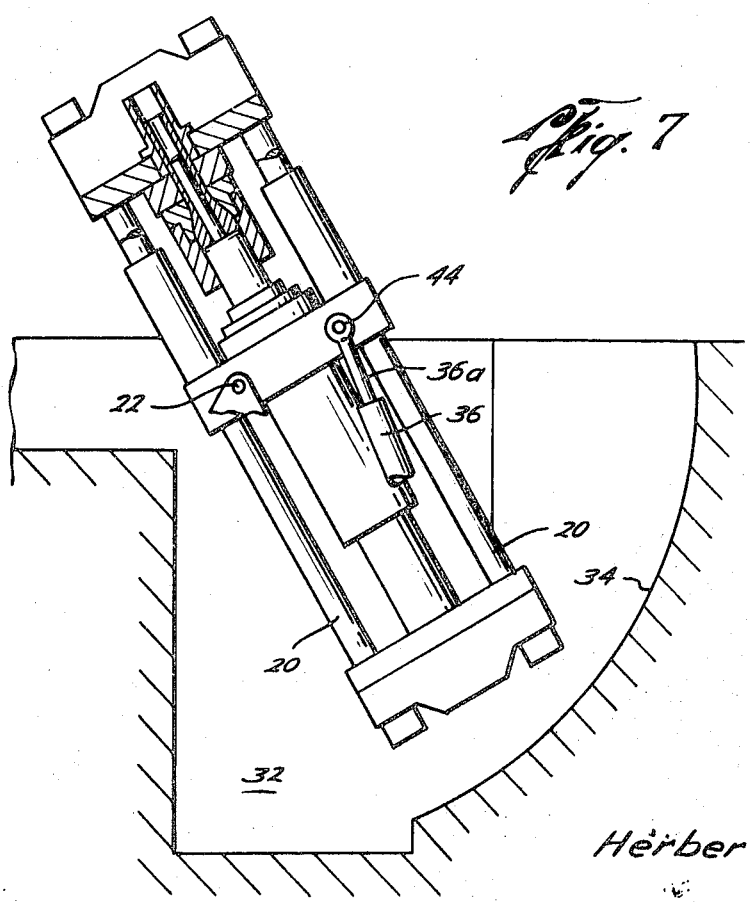
FIG. 7 is a view showing the press of the apparatus in an intermediate position as it is moved between a vertical and a horizontal position.

In FIG. 6 the extrusion operation has begun. Platen 12 is being moved downwardly toward fixed platen 10 by power cylinder 14. The material of the preform is being extruded through the annular space between throat 62 and mandrel 52. Can 60 is moving downwardly over pedestal 50 to force the preform to be so extruded. With the extrusion operation started, fluid pressure is supplied to cylinders 36 and 38 to pivot the press around the axes of trunnions 22 and 24 to move the press through the intermediate position of FIG. 7 to a horizontal position, as shown in FIG. 8. Preferably in practicing the method of this invention, the extrusion process is begun with the press in the vertical position and the press then is rotated to the horizontal position shown in FIG. 8 before the extruded material begins to pass out the top of tubular guide member 68.

This is preferred because it allows the preform to freely adjust its alignment with the die without having its own weight working against it. This would not be necessary, of course, to obtain most of the benefits of this invention.

Means are provided to support the extrusion as it leaves the press when the press is in the horizontal position. As shown in FIG. 8, a plurality of rollers 70 are supported in spaced parallel position to engage extrusion 72 as it moves laterally to the left in a horizontal direction. Thus, the advantage of a horizontal press in that long extrusions can be handled by simple and relatively inexpensive equipment is realized.

From the foregoing description of one embodiment of this invention, by way of example, it will be seen that this invention is one well adapted to attain all of the ends and objects hereinabove set forth, together with other advantages which are obvious and which are inherent to the apparatus and structure.

The invention having been described, what is claimed is:

1. A press for forming a material comprising two platens, means for moving the platens apart and for moving the platens together, and means supporting the press for pivotal movement between a first position with the platens substantially horizontal for positioning the material between the platens, and a second position with the platens substantially vertical for pressing the material in a substantially horizontal direction.

2. A press for forming an extrusion from a preform of the material to be extruded, comprising two platens, means for moving the platens apart to permit a preform of the material to be extruded and the dies for extruding the preform to be positioned between the platens and for moving the platens together to cause the dies to extrude the preform, means supporting the press for pivotal movement between a first position where the platens are substantially horizontal so the preform, when positioned between the platens for extrusion, is supported on a surface that does not require lubrication and the weight of the preform will not urge the preform out of alignment with the die and a second position where the platens are substantially vertical for extruding the preform in a substantially horizontal direction.

3. The press of claim 2 in which one platen is fixed and the other is movable toward and away from the fixed platen.

4. The press of claim 3 in which one platen has an opening through which the extruded material moves as the platens are moved together.

5. The press of claim 4 in which the opening is in the movable platen and the movable platen is above the fixed platen when the press is in the first position.

6. The press of claim 5 further provided with means for supporting the extrusion as it is extruded in a horizontal direction.

7. A press assembly for forming an elongated tubular extrusion by extruding material through the annular space between inner and outer concentric die members that include a can and a central mandrel comprising, a movable platen and a fixed platen, means for moving the platens apart to permit the die members and the material to be positioned therebetween with the material substantially unsupported by the can and the central mandrel and for moving the platens together to extrude the material from the die members as an elongated tubular extrusion, means supporting the press for pivotal movement from a vertical position to extrude the material in a vertical direction and a horizontal position to extrude the material in a horizontal direction, means for moving the press between the vertical and horizontal position, and means for supporting the extrusion as it moves horizontally from the die members.

8. The extrusion press of claim 7 in which the movable platen has an opening through which the extrusion moves as the material is extruded by the die members.

9. An extrusion press comprising a fixed platen and a movable platen, means for moving the movable platen away from the fixed platen far enough to allow a preform of the material to be extruded and an extrusion die for extruding the preform to be positioned between the platens and for moving the movable platen toward the fixed platen to force the preform to be extruded by said die, means supporting the press for movement between a position with the platens movable vertically to enclose the preform in the die and a position with the platens movable horizontally to extrude the preform in a substantially horizontal direction, and means positioned adjacent the press to support the extrusion as it moves horizontally from the die.

10. A method of extruding a relatively short preform of material into a relatively long extrusion, comprising the steps of positioning the preform for extrusion in a substantially vertical direction, starting the extrusion of the material in a vertical direction, rotating the preform and the extruded material until the material is being extruded in a substantially horizontal direction, and completing the extrusion of the preform.

11. The method of claim 10 with the additional step of supporting the extruded material as it is extruded in a substantially horizontal direction.

12. A method of forming an elongated tubular extrusion from a preform of material by extruding the preform from between inner and outer concentric die members, comprising the steps of arranging the preform material between the die members to be extruded vertically by the die members as the die members move together, moving the die members toward each other to extrude the preform, and rotating the die members to extrude the preform in a horizontal direction.

13. The method of claim 11 including the steps of supporting the extrusion as it is extruded in a horizontal direction.

14. A method of forming an elongated tubular extrusion comprising the steps of positioning a preform of the material to be extruded between platens, moving at least one of the platens vertically to position extrusion die members around the preform and to extrude the preform from the die, rotating the platens and die to extrude the preform in a horizontal direction, and supporting the extrusion as it is extruded in a horizontal direction.

* * * * *